US011622359B2

(12) United States Patent
Rose et al.

(10) Patent No.: US 11,622,359 B2
(45) Date of Patent: Apr. 4, 2023

(54) FREQUENCY CHANNEL ASSIGNMENT FOR SHARED SPECTRUM ACCESS

(71) Applicant: Nokia Solutions and Networks Oy, Espoo (FI)

(72) Inventors: Luca Rose, Orsay (FR); Navin Hathiramani, Coppell, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 67 days.

(21) Appl. No.: 17/153,317

(22) Filed: Jan. 20, 2021

(65) Prior Publication Data
US 2021/0250959 A1    Aug. 12, 2021

Related U.S. Application Data

(60) Provisional application No. 62/972,875, filed on Feb. 11, 2020.

(51) Int. Cl.
| | |
|---|---|
| *H04W 72/10* | (2009.01) |
| *H04W 16/10* | (2009.01) |
| *H04W 72/04* | (2009.01) |
| *H04W 72/06* | (2009.01) |
| *H04W 72/08* | (2009.01) |
| *H04W 72/0453* | (2023.01) |

(52) U.S. Cl.
CPC ........... *H04W 72/10* (2013.01); *H04W 16/10* (2013.01); *H04W 72/0453* (2013.01); *H04W 72/06* (2013.01); *H04W 72/085* (2013.01)

(58) Field of Classification Search
USPC ....................................................... 370/329
See application file for complete search history.

(56) References Cited

U.S. PATENT DOCUMENTS

| | | | |
|---|---|---|---|
| 7,929,974 B1* | 4/2011 | Walters | H04W 28/16 370/395.4 |
| 2018/0063844 A1* | 3/2018 | Khoshnevisan | H04W 72/048 |

(Continued)

OTHER PUBLICATIONS

Wireless Innovation Forum (Requirements for Commercial Operation in the U.S. 3550-3700 MHz Citizens Broadband Radio Service Band, WINNF-15-S-0112,, https://www.wirelessinnovation.org/assets/work_products/Specifications/winnf-15-s-0112-v2.0.0%20cbrs%20operational%20and%20functional%20req (Year: 2017).*

*Primary Examiner* — Kwang B Yao
*Assistant Examiner* — Xuan Lu
(74) *Attorney, Agent, or Firm* — Joseph C. Drish; Harrington & Smith

(57) ABSTRACT

A method includes generating an initial assignment, for a plurality of counties, of a logical channel obtained by a priority access license user to a physical channel, considering a plurality of preferred channel assignments of the users within each county; generating a county prioritization list that prioritizes counties having challenges resulting from the initial assignment; executing a series of algorithms, for each county within the county prioritization list, to continue to assign the physical channels to comply with a set of requirements of the priority access license users; and updating, for each priority access license user, a similarity metric that measures a similarity between a desired physical channel assignment and an actual physical channel assignment, wherein the metric is used during the continuation of the assignment of the physical channels.

24 Claims, 4 Drawing Sheets

(56) References Cited

U.S. PATENT DOCUMENTS

| | | | | |
|---|---|---|---|---|
| 2018/0376341 A1* | 12/2018 | Khoshnevisan | ........ | H04L 5/001 |
| 2020/0092731 A1* | 3/2020 | Beck | ..................... | H04W 16/14 |
| 2020/0236038 A1* | 7/2020 | Liu | ...................... | H04L 45/125 |
| 2020/0314659 A1* | 10/2020 | Hannan | ................. | H04W 4/029 |
| 2021/0022007 A1* | 1/2021 | McFadden | ............ | H04W 28/26 |
| 2021/0084658 A1* | 3/2021 | Sheriff | .................. | H04W 28/16 |

* cited by examiner

FREQUENCY CHANNEL ASSIGNMENT FOR SHARED SPECTRUM ACCESS

RELATED APPLICATION

This application claims the benefit of U.S. Provisional Application No. 62/972,875, filed Feb. 11, 2020, which is incorporated herein by reference in its entirety.

TECHNICAL FIELD

The examples and non-limiting embodiments relate to communications, and more particularly, to frequency channel assignment for shared spectrum access.

BACKGROUND

It is known to coordinate operations among users within frequency bands.

SUMMARY

In accordance with an aspect, a method includes generating an initial assignment, for a plurality of counties, of a logical channel obtained by a priority access license user to a physical channel, considering a plurality of preferred channel assignments of the users within each county; generating a county prioritization list that prioritizes counties having challenges resulting from the initial assignment; executing a series of algorithms, for each county within the county prioritization list, to continue to assign the physical channels to comply with a set of requirements of the priority access license users; and updating, for each priority access license user, a similarity metric that measures a similarity between a desired physical channel assignment and an actual physical channel assignment, wherein the metric is used during the continuation of the assignment of the physical channels.

In accordance with an aspect, an apparatus includes at least one processor; and at least one non-transitory memory including computer program code; wherein the at least one memory and the computer program code are configured to, with the at least one processor, cause the apparatus at least to perform: generate an initial assignment, for a plurality of counties, of a logical channel obtained by a priority access license user to a physical channel, considering a plurality of preferred channel assignments of the users within each county; generate a county prioritization list that prioritizes counties having challenges resulting from the initial assignment; execute a series of algorithms, for each county within the county prioritization list, to continue to assign the physical channels to comply with a set of requirements of the priority access license users; and update, for each priority access license user, a similarity metric that measures a similarity between a desired physical channel assignment and an actual physical channel assignment, wherein the metric is used during the continuation of the assignment of the physical channels.

In accordance with an aspect, a non-transitory program storage device readable by a machine, tangibly embodying a program of instructions executable by the machine for performing operations is provided, the operations comprising: generating an initial assignment, for a plurality of counties, of a logical channel obtained by a priority access license user to a physical channel, considering a plurality of preferred channel assignments of the users within each county; generating a county prioritization list that prioritizes counties having challenges resulting from the initial assignment; executing a series of algorithms, for each county within the county prioritization list, to continue to assign the physical channels to comply with a set of requirements of the priority access license users; and updating, for each priority access license user, a similarity metric that measures a similarity between a desired physical channel assignment and an actual physical channel assignment, wherein the metric is used during the continuation of the assignment of the physical channels.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
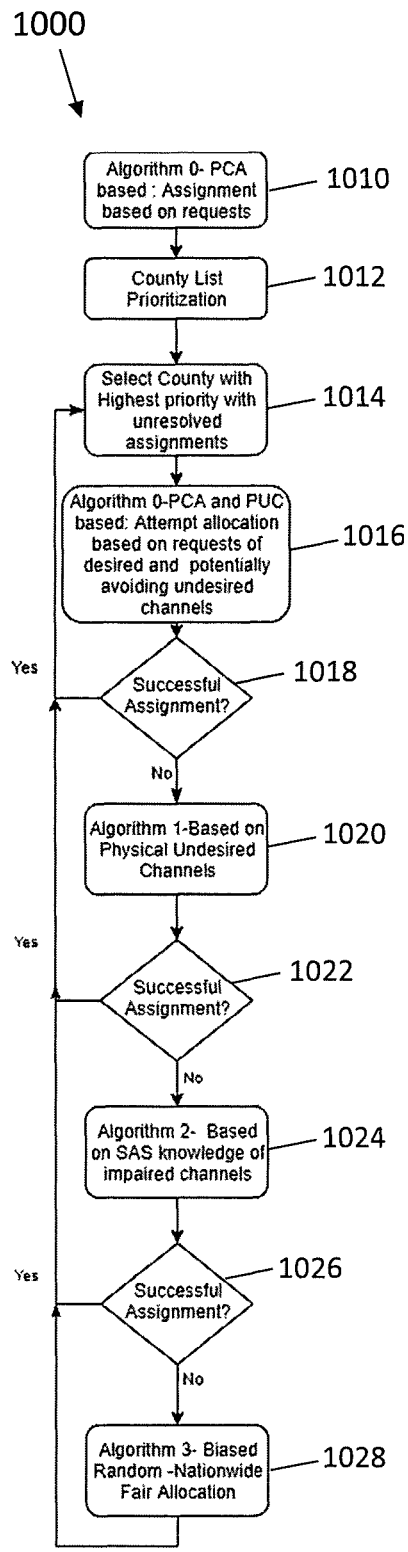
FIG. 1 depicts an example channel assignment procedure based on the examples described herein.

The following acronyms and abbreviations that may be found in the specification and/or the drawing figures are defined as follows:

5G fifth generation
5GC 5G core network
AC assignable channels
AMF access and mobility management function
CBRS Citizens Broadband Radio Service
CBSD Citizens Broadband Radio Service Device
CU central unit
DSP digital signal processor
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FCC Federal Communications Commission
GAA General Authorized Access
gNB (or gNodeB) base station for 5G/NR, i.e., a node providing NR user plane and control plane protocol terminations towards the UE, and connected via the NG interface to the 5GC
IA Incumbent Access
I/F interface
LTE long term evolution
MAC medium access control
MME mobility management entity
ng or NG new generation
ng-eNB or NG-eNB new generation eNB
NP nondeterministic polynomial
NR or NR- new radio N/W or NW network
PAL Priority Access License
PCA Preferred Channel Assignment
PDA personal digital assistant
PDCP packet data convergence protocol
PHY physical layer
PR Piloted Randomness
PUC Physical Undesired Channels
RAN radio access network
RLC radio link control
RRH remote radio head
RRC Radio Resource Control
RU radio unit
Rx receiver
SAS Spectrum Access System
SDAP service data adaptation protocol
SGW serving gateway
SMF session management function
Tx transmitter
UE User Equipment (e.g., a wireless, typically mobile device)
UPF user plane function
WINNF Wireless Innovation Forum In 2015, the FCC adopted rules for shared commercial use of the 3550-3700 MHz band (3.5 GHz band). It established the Citizens Broadband Radio Service (CBRS) and created a three-tiered access scheme along with an authorization framework to accommodate shared federal and non-federal use of the band. The rules governing the CBRS are found in the FCC Part 96 regulation.

Access and operations within this band are managed by an automated frequency coordinator, known as the Spectrum Access System (SAS). The primary role of the SAS is to coordinate operations between and among users in three tiers of authorization in the 3.5 GHz band: Incumbent Access, Priority Access, and General Authorized Access. Incumbent access (IA) holds the highest priority and includes grandfathered technologies and navy/military spectrum access. Priority access license (PAL), includes users which have obtained rights to certain frequency resources of the CBRS band via an FCC held auction process, whereas General Authorized Access (GAA) includes all users which desire to employ the CBRS band with no guarantee of performance.

FCC part 96 rules state that up to 70 MHz of spectrum can be allocated per county to PAL users via an auction process set to start in June 2020. PAL licenses will be auctioned in 10 MHz channels on a per-county basis. PAL licensees must meet FCC established deployment requirements in order to be eligible to renew their licenses at the end of a 10 year period. PAL deployments must protect and accept interference from incumbent users but shall be protected from co-channel interference of General Authorized Access users.

As per the FCC part 96 rules the PAL channels can be allocated by the SAS within the 3550-3650 MHz range of the CBRS band. Up to seven PAL channels may be licensed in any given county, subject to a maximum of four PAL channels for any licensee. It should be noted that during the PAL auction process a licensee acquires the right to a certain amount of bandwidth/channels put not to a specific channel within the 3550-3650 MHz range. As per FCC, it is the SAS's responsibility to map the logical channels a PAL licensee obtains from the auction to the physical channels that a PAL CBSD shall employ for transmissions. The actual physical channel allocation can be dynamically changed and as per FCC regulations, to the extent possible, the SAS shall try to ensure contiguity of the channels of the different PAL licensees on a per county basis.

This problem of fair channel allocation is first crossed on the CBRS band, the world's first shared spectrum band, but it is expected to be present in other shared bands too where either channel impairments exist.

The PAL channel allocation mechanism of a SAS is required to be transparent and fair and is bound by a number of constraints. FCC regulations demand the SAS to attempt to allocate contiguous channels to PAL users that obtain more than one channel during the auction. Moreover, not all physical channels are expected to yield the same performance. For example, channels located on the lower end of the CBRS band are bound to stricter out of band emission constraints due to federal regulations. Other channels are prone to be temporarily deactivated due to incumbent protection, and/or are disliked for known high levels of interference.

The task of the SAS can hence be summarized as follows:
1) Assign channels for all the PAL users
2) To the extent possible, allocate contiguous channels to PAL users holding more than one channel license
3) To the extent possible, avoid the assignment of known low-quality channels
4) To the extent possible, accommodate for PAL licensee preferred channels
5) To the extent possible, allow for the same channels to be assigned across counties PAL Channel association results can easily derive in a NP-hard problem when considering the imposed constraints. Simple random allocation would break all the constraints, whereas simple allocation avoiding disregarded channels would break contiguity of allocation. Additionally, PAL licensees unsatisfied with PAL channel allocations can lead to legal issues for SAS admins, hence the PAL channel allocation process requires a transparent solution where fairness can be demonstrated.

Current proposals for PAL Channel mapping are based either on random assignment or the maximization of an objective function. Such techniques fall short either for efficiency and fairness (random assignment) or for excess of complexity (objective function).

Based on one submitted contribution (Document Number WINNF-20-I-00018) to the Wireless Innovation Forum, the suggested PAL channel method is based on an objective function where each operator can weight its priorities. While there are technical merits to this type of solution, it lacks transparency and it's computationally complex (NP-HARD). Furthermore, there is no assurance that different SAS vendors employing an objective function would reach the same solution, hence PAL licensees who have selected different SAS vendors may be allocated channels differently. The proposal specified by Document Number WINNF-20-I-00018 is to be applied county by county but has no method to establish a County prioritization list which can significantly impact the outcome of a channel mapping procedure.

Based on another submitted contribution (Document Number WINNF-20-I-00017), if all constrains (constraints) are to be considered, even within a county the methods based on random selection may be required. The proposal specified by Document Number WINNF-20-I-00017 is a single algorithm approach attempting to address only a single criterion during the allocation and falls back to a random approach when the single criterion is not met. Additionally, it should be noted that the proposal specified by Document Number WINNF-20-I-00017 is a county approach and hence it cannot accommodate same channel assignment across counties. No considerations are made on attempting to ensure same channel allocation in neighboring counties with the proposed random procedure.

The examples described herein provide a multi-algorithmic approach which attempts to optimize different criteria and it's applied nationwide with weight factors to better ensure fairness and inter county contiguous assignments. The examples described herein provide a higher transparency solution, which is vital when handling licensees unsatisfied with the result of the channel mapping. The examples described herein also allow for easier adaptation to change in circumstances, e.g., increased number of impaired channels due to new incumbent deployments, which do not require a huge amount of input (weight based) from PAL licensees which would extend the time for updated PAL channel allocation.

The interest around Spectrum sharing and incumbent protection or user prioritization is quickly rising in different regions for different bands. The below detailed description of the provided method is specific for the United States (US) CBRS band, however the same concepts could be applied for other bands or frameworks outside of CBRS where a channel mapping procedure is required and not all channels in the assignable range are considered equal; and there are a number of constrains to be considered during the channel allocation.

The method described herein provides a channel-user allocation mechanism, intended to be adopted at a central controller as a SAS, that respects the following constraints:
1) Assign channels for all the PAL users.
2) To the extent possible, allocate contiguous channels to PAL users holding more than one channel license
3) To the extent possible, avoid the assignment of known low-quality channels
4) To the extent possible, accommodate for PAL licensee preferred channels
5) To the extent possible, allow for the same channels to be assigned across counties The method ensures fairness (no-discrimination between PAL users) and avoids high complexity from an implementation or computational point of view. In contrast, methods that are not fair or have high complexity typically lead to a decrease in transparency of how the solution was derived.

The method provided and described herein includes of a set of four algorithms to be run sequentially in the SAS. If one of the demanded constraints is reduced (or modified), the relative algorithms can be adjusted, yielding a simple yet efficient framework for channel allocation.

The proposed algorithms are elastic, in the sense that they allow the PAL users to tune their preference, and can be slightly modified to incorporate ordered preference, etc.

The provided method differs from the prior art in the multi algorithmic approach to resolving the channel allocation problem with the capability of dynamically varying the constrain (constraint) factors in search of an ideal solution. Additionally, the method described herein is not focused on resolving the issue for a single county but addressing inter county fairness and contiguous channel assignment too.

The provided method comprises of a series of algorithms to be run in sequence. A flow chart summarizing the sequence of the algorithms is shown in FIG. 1.

At a high level, the specified procedure first attempts an assignment in all counties individually, considering the preferred channel assignments in each county. This provides a preliminary list of counties where there is a solution which satisfies everyone's preferred configuration, and a list of counties where trade-offs in some of the requirements from the PAL licensees are required.

In the next step, the two lists are employed to generate a County Prioritization List, where counties with the highest challenges in channel mapping may be at the top.

For each county in the County Prioritization List, the series of algorithms may be executed with the aim of complying a much a possible with requirements associated with PAL licensees.

After a county's assignment has ended successfully, a happiness factor per PAL licensee is updated. This happiness factor is a metric that measures the similarity between the desired channel allocation by the PAL licensees and the resulting allocation. This happiness factor is used in successive steps of the channel mapping procedure to ensure inter-county fairness in the allocations, i.e., the amount of satisfaction/dissatisfaction is balanced across for all PAL licensees when observed over all the counties.

While going through the County Prioritization List for the channel allocations, any county for which previously a solution was found in which the desired channels for all licensees could be granted is re-evaluated to ensure if another option of the desired solution list provided by the PAL licensees can guarantee, e.g., better inter county channel allocation to ensure smoother mobility procedures.

The channel mapping procedure finalizes when all counties have been assigned channels. The final metric of the happiness factor, at the end of the allocation, should have minimum deltas between PAL licensees with licenses in several counties, i.e., the fairness is averaged over the county.

Any change in the number and/or location of the impaired channels in a given county may be easily assessed by re-evaluating the happiness factor for the specific county. A high imbalance in the happiness factor may be the trigger for a re-evaluation of the channel mapping in the county and its neighboring counties.

FIG. 1 thus depicts an example channel assignment procedure 1000 based on the examples described herein. In summary: at 1010, the method includes a PCA based Algorithm 0 comprising assignment based on requests. At 1012, the method includes county list prioritization. At 1014, the method includes selecting a county with the highest priority with unresolved assignments. At 1016, the method includes a PCA and PUC based Algorithm 0, including attempting allocation based on requests of desired and potentially avoiding undesired channels. At 1018, the method includes determining whether there was a successful assignment. If the determination at 1018 is positive (e.g., "Yes"), the method proceeds to 1014. If at 1018 the determination is negative (e.g., "No"), the method proceeds to 1020. At 1020, the method includes Algorithm 1—Based on Physical Undesired Channels. At 1022, the method includes a determination of whether there is a successful assignment. If the determination at 1022 is positive (e.g., "Yes"), the method proceeds to 1014. If the determination at 1022 is negative (e.g., "No"), the method proceeds to 1024. At 1024, the method includes Algorithm 2, based on SAS knowledge of impaired channels. At 1026, the method includes a determination of whether there is a successful assignment. If the determination at 1026 is positive, the method proceeds to 1014. If the determination at 1026 is negative (e.g., "No"), the method proceeds to 1028. At 1028, the method includes Algorithm 3—biased random nationwide fair allocation. Following 1028, the method proceeds to 1014, in a loop. Algorithm 0, Algorithm 1, Algorithm 2, and Algorithm 3 are discussed within this description.

The following subsections provide a detailed description of the different algorithms, including those shown in FIG. 1, which are part of the Channel Assignment Procedure described herein.

Definitions. The examples described herein rely on two terms which are employed during the Channel assignment procedure:

Preferred channel assignments (PCA): A set of channels preferred in that specific county from a specific PAL user's point of view. PCA may be used, for instance, to indicate what channels are considered highly impaired by the PAL licensee or their preference of a channel based on the allocation in a neighboring county.

Physical undesirable channels (PUC): A set of channels that a particular PAL user does not want to use. This is a prioritized list: i.e., ordered from the least undesired to the most undesired.

Piloted Randomness (PR): Random but with a probability distribution that is dependent from the happiness level of each PAL licensee. For example, between two PAL licensees with different happiness levels, the PR should favor the more unhappy one. The exact function between happiness and distribution is out of the scope of this disclosure and does not impact the functionality of the examples described herein.

Algorithm 0. The objective of this algorithm is to verify if there is any possible solution where every PAL licensee's requirements can be met. The SAS shall communicate to the PALs an integer M (representing the maximum number of Preferred Channel Assignments (PCA) each PAL can indicate. Each PCA may be composed of a set of integers, representing the physical channels preferred by the PAL licensee. For example, a PAL user that won 3 logical channels in the FCC auction, could indicate {1,2,3; 2,3,4; 3,4,5} when M>=3.

Notice that in the example the sets are contiguous, however this does not constitute a mandatory rule.

An exhaustive search (or any reduction of it, such as Viterbi) is run through the indicated PCAs of the PAL licensees within the county in order to establish if a combination is possible. If a solution does not exist, then the SAS selects the solution that minimizes the unhappiness, i.e., the one that assigns the largest set of PCAs. Among different equivalent assignments the SAS selects randomly.

Such selection is presented to the PAL user for which the selection does not match the PAC constraint. If the PAL users accept (or if none of the channels assigned is a PUC) then the assignment is complete. Otherwise other attempts are done. A schematic pseudo code of the algorithm is represented hereunder.

Assumption: K PAL users
Step 1
  Test all combinations. For each combination mark the amount of contrast (i.e., number of channels present in more than 1 PCA.
Step 2
If zero contrasts solution exists: assign randomly one of the solutions. Return 1
If not go to step 3
Step 3
Enumerate all possible solutions with lowest contrast.
While solutions exist:
  Select randomly (using a PR, hence including the happiness as a factor) among the solutions with lowest contrast. Assigning to one of the PAL in contrast one of the free channels not in the PUC of that PAL.
  If it's possible, assign and return 1
  If not possible remove this solution from the list
End while
If nothing found, return 0.

Transparency and fairness evaluation: The PAL licensees per county will be publicly known from the FCC auction results, however the PCA per user may not be publicly known. Considering that if the algorithm reaches a solution based on PCA's, everyone's established needs are satisfied and there is no need for the SAS vendor to disclose PCA's. If the algorithm reaches a solution based on the PUC, the happiness factor is evaluated per PAL licensee in the county and may be employed for inter-county fairness.

When this algorithm is executed prior to the formation of the County Prioritization List, it is only based on PCA's, i.e., execution is stopped in Step 2. When this algorithm is executed and multiple solutions are possible, the solution which maximizes the same channel assignment across neighbor counties for the PAL licensee with the lowest happiness metric is selected.

County List prioritization. The target of this procedure is to generate a prioritized list of counties which may later be employed for channel mapping purposes.

The county with the highest priority, i.e., first to be tackled, from a channel assignment point of view shall be the one with highest number of constrains, which may be determined based on a weighted function e.g.: consider whether this is fair. The county list prioritization procedure may consider the following factors:
  Number of PAL licensees in the county
  Sum of the PUC of all PAL licensees in the county
  Number of impaired channels, as per SAS, in the county
  Number of neighbor counties where Algorithm 0 could not find a successful solution based on the PCA's.

The objective of this list is to ensure inter-county fairness and to attempt to assign the same channel across neighboring counties where a PAL licensee has PAL rights.

Algorithm 1. The purpose of this algorithm is to respect, within possible limits, the preferences of the PAL licensees but without considering their PCAs. Each PAL licensee is allowed to indicate up to N (where N is an integer set by the SAS) Physical Undesired Channels (PUCs). The list of assignable channels is denoted by AC. Starting from the PAL licensee demanding the largest set of contiguous channels the algorithm proceeds as follows:
  Remove the PUCs of the PAL user from the AC, and assign a contiguous portion of spectrum (if available) to the PAL user.
  The assigned channels are then removed from the AC
  Proceed with the second PAL licensee.
  If it is not possible to find an allocation, the algorithm mounts back one step and tries a different allocation for the previous users. The algorithm terminates either with a failure or with an allocation. The contiguous set of physical channels selected for a PAL user is without loss of generality indicated by the first channel.

A schematic pseudo code of the algorithm is represented hereunder.
Step 1
  1) Order the users (PAL licensees) from the one requesting the largest set of contiguous channels to the least, indicate such list by the vector V. Note if there are several users with the same number of PAL channels, they may be ordered randomly or based on the happiness metric(s).
  2) Set n=1.

Step 2
User selected=V(n).
Remove from the assignable channel set the channel disliked from the user. Allocate the channels from the first available channel. If no set of contiguous set of channels is available, then:
  1) If n=1, return(0)
  2) If n>0, set n=n−1. Add V(n).first_channel to the list of disliked channels and repeat Step 2.
Otherwise:
  1) Set V(n).first_channel=the first channel allocated to the user.
  2) Remove the channels allocated to user n from the list of assignable channels.
  3) If n=N, return(1).
  4) If n<N, set n=n+1, repeat 2.
If the algorithm returns 1, an allocation respects contiguous allocation and does not allocate any disliked channel to each user.

Two potential variants can be applied to Algorithm 1 if it does not converge to a solution, i.e., it returns 0. In one variant, the SAS can truncate the PUCs provided to a lower value of N. After this passage, algorithm 1 can be reiterated. In another variant, the SAS selectively reduces the PUCs of PAL licensees considering the following 2 criteria: 1) Even though the PAL licensee has included a specific channel in the PUC, it allows for inter county contiguity, i.e., same channel allocation across neighboring counties. In this case the channel is removed from the PUC; 2) The SAS only truncates the PUCs for PAL licensees with a highest happiness metric.

Transparency and fairness: the PAL licensees per county will be publicly known from the FCC auction results, however the PUC per user may not be publicly known. Considering that if the algorithm reaches a solution without the usage of the optional passage, everyone's established needs are satisfied and there is no need for the SAS vendor to disclose PUC's. If the algorithm reaches a solution based on the optional passage, the happiness factor is evaluated per PAL licensee in the county and may be employed for inter-county fairness.

The contiguous set of channels is indicated by the first channel selected (the other contiguous being the adjacent). Here the "first" channel is referred to as the one with the lowest frequency. If two or more PAL users have the same amount of logical channels, then their order may be either random or set by the administrator following specific and public rules.

Algorithm 2. If algorithm 1 fails, then it is not feasible to find an allocation respecting the undesired channels list of the PAL users and the contiguity of channels imposed by FCC. In this case, or in case the first algorithm is not implemented for administrator choices, algorithm 2 is run.

Here, the impaired channels are known by the SAS, and hence the SAS avoids their allocation. SAS has an understanding of channels that may yield lower performance based on spectrum mask, interference calculations/power limitations and incumbent protection. Such channels are removed from the list, and the allocation begins from the PAL users demanding the largest set of contiguous channels.

A schematic pseudo-code of the algorithm is provided hereunder.
Step 1
Remove from the set of assignable channels, the ones known from the SAS to be lower quality.

Step 2
List the users from the one requesting largest set of contiguous to the least, denote this set as the vector V. Note if there are several users with the same number of PAL channels, they may be ordered randomly.
Set n=1
Step 3
For V(n) allocate a set of contiguous channels using the lowest possible V(n).first_channel.
If an allocation is not possible, return 0.
If an allocation is found, then
  If n=N return 1.
  If n<N, then set n=n+1, and repeat step 3.
  If the algorithm returns 0, then no allocation is possible and the channels known to yield lower performance need to be assigned. This is done following algorithm 3. If the algorithm returns 1, then an allocation in which none of the known bad channels is assigned is found.

Transparency and fairness: The PAL licensees per county will be publicly known from the FCC auction results and the SAS considerations of impaired channels can be shared by the SAS admins with the PAL licensees.

If the algorithm returns 0, the SAS can reduce the set of non-assignable channels. After this passage algorithm 2 can be reiterated.

Algorithm 3. Algorithm 3 is used in order to avoid allocating bad channels always to the same type of users (largest or smallest set of contiguous channels demanded). Starting with the first AC, a user is randomly (where randomly means following a PR) selected, and it may be assigned the first AC and all the subsequent channels until the demanded consecutive channel is fulfilled. The assigned channels are removed from the AC list, and the algorithm begins again.

A schematic pseudo-code is reported hereunder.
Step 1
Order the PAL users randomly, and report the order in a vector V.
Set n=1.
Step 2
Assign V(n).first_channel=the first available channel.
Remove the channels assigned from the list of the available channels.
If n=N, return 1.
If n<N then set n=n+1, repeat Step 2.

Transparency and fairness: The PAL licensees per county will be publicly known from the FCC auction results, the ordering of users in vector V can be based on a pseudo-random number generator where the seed is set to e.g., the county number. This ensures equal probability of being the first user to be allocated resources for users spanning across all counties.

Figure 2:
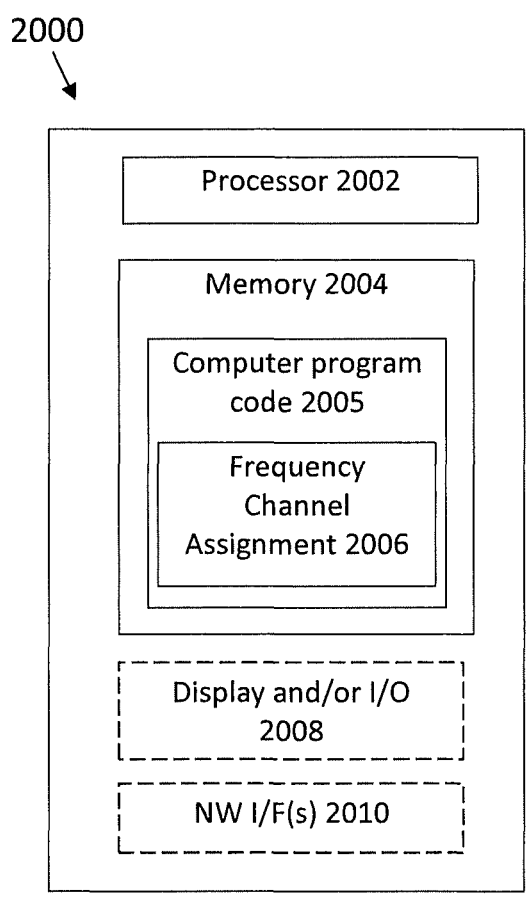
FIG. 2 is an example apparatus, which may be implemented in hardware, configured to implement frequency channel assignment for shared spectrum access based on the examples described herein.

FIG. 2 is an example apparatus 2000, which may be implemented in hardware, configured to implement frequency channel assignment for shared spectrum access based on the examples described herein. The apparatus 2000 comprises a processor 2002, at least one non-transitory memory 2004 including computer program code 2005, wherein the at least one memory 2004 and the computer program code 2005 are configured to, with the at least one processor 2002, cause the apparatus to implement frequency channel assignment 2006 based on the examples described herein. The apparatus 2000 optionally includes a display 2008 that may be used to display aspects of the system or to provide input and output (I/O). The apparatus 2000 optionally includes one or more network (NW) interfaces (I/F(s)) 2010. The NW I/F(s) 2010 may be wired and/or wireless and communicate over the Internet/other network(s) via any communication technique. The NW I/F(s) 2010 may comprise one or more transmitters and one or more receivers. The N/W I/F(s) 2010 may comprise standard well-known components such as an amplifier, filter, frequency-converter, (de)modulator, and encoder/decoder circuitries and one or more antennas. The apparatus 2000 need not comprise each of the features mentioned, or may comprise other features as well (e.g. an interface facilitating communication between or bus connecting the various items of apparatus 2000). The apparatus 2000 may be a controller of a spectrum access system (SAS).

Figure 3:
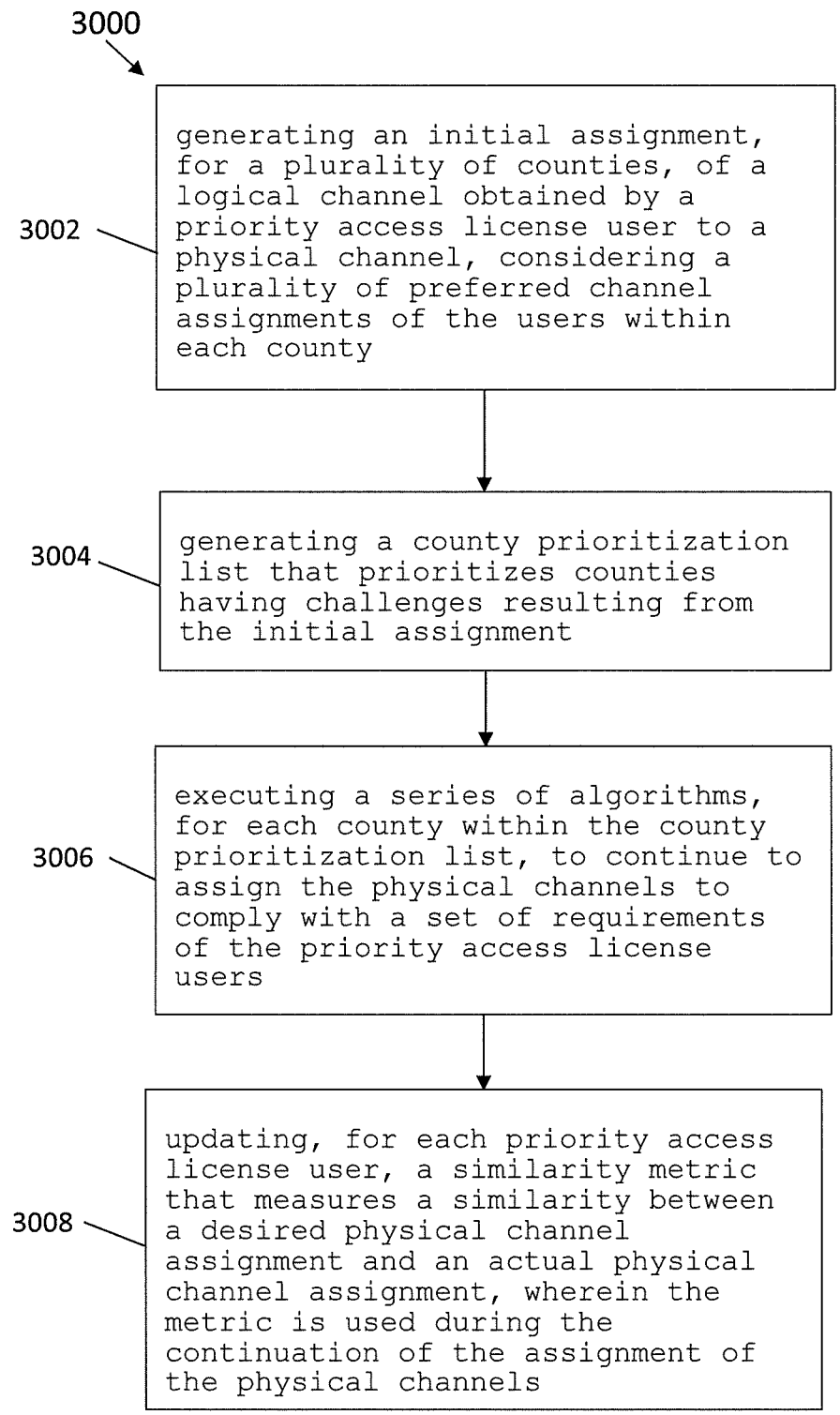
FIG. 3 is an example method to implement frequency channel assignment for shared spectrum access based on the examples described herein.

FIG. 3 is an example method 3000 to implement frequency channel assignment for shared spectrum access based on the examples described herein. At 3002, the method includes generating an initial assignment, for a plurality of counties, of a logical channel obtained by a priority access license user to a physical channel, considering a plurality of preferred channel assignments of the users within each county. At 3004, the method includes generating a county prioritization list that prioritizes counties having challenges resulting from the initial assignment. At 3006, the method includes executing a series of algorithms, for each county within the county prioritization list, to continue to assign the physical channels to comply with a set of requirements of the priority access license users. At 3008, the method includes updating, for each priority access license user, a similarity metric that measures a similarity between a desired physical channel assignment and an actual physical channel assignment, wherein the metric is used during the continuation of the assignment of the physical channels.

Figure 4:
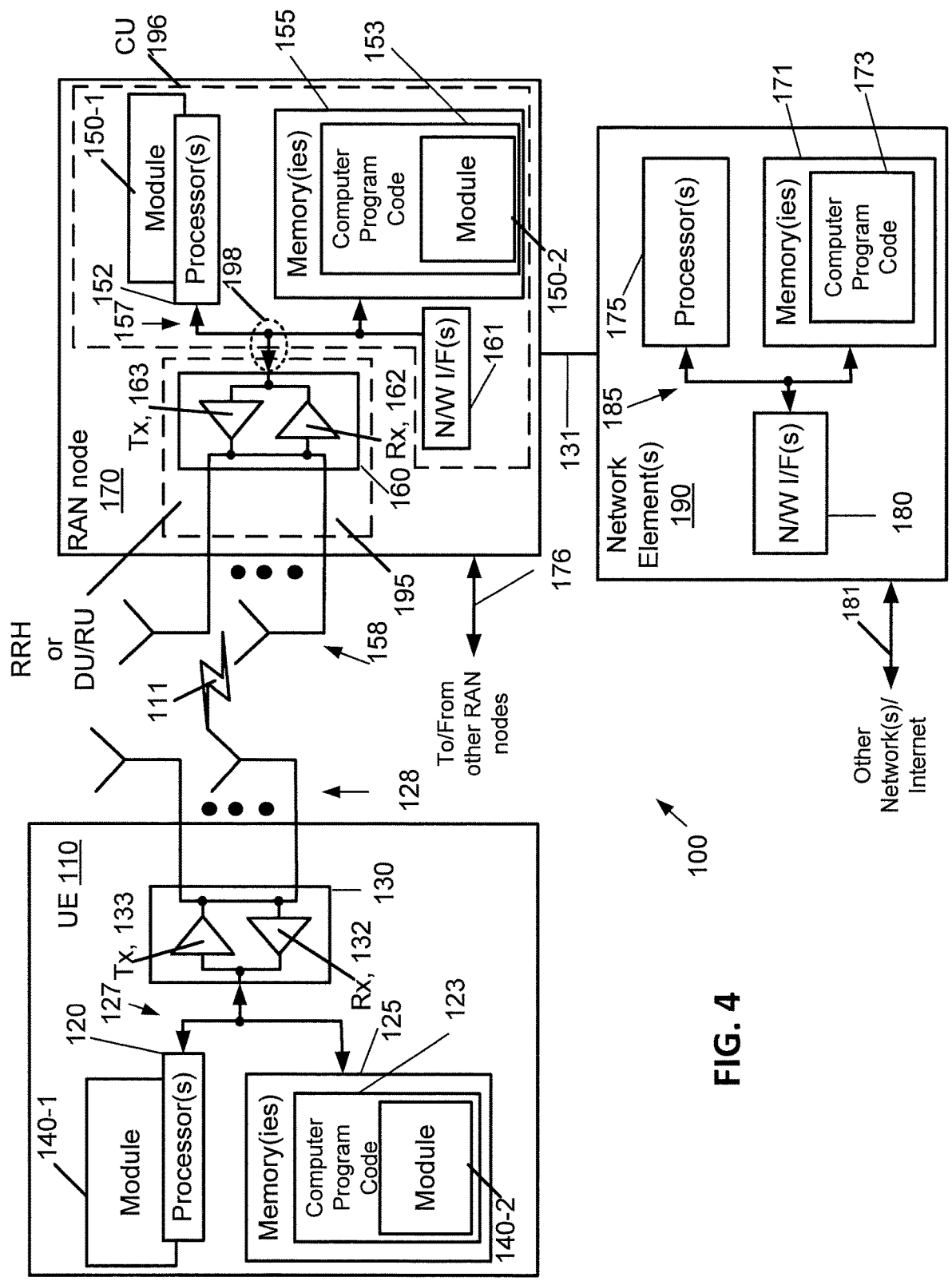
FIG. 4 is a block diagram of one possible and non-limiting system in which the example embodiments may be practiced.

Turning to FIG. 4, this figure shows a block diagram of one possible and non-limiting example in which the examples may be practiced. A user equipment (UE) 110, radio access network (RAN) node 170, and network element(s) 190 are illustrated. In the example of FIG. 4, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or a combination of the modules depicted in FIG. 4 may operate to implement the method of FIG. 1, FIG. 3, and the examples described herein generally for implementing frequency channel assignment for shared spectrum access, including module 140-1 and 140-2 of the UE 110, module 150-1 and 150-2 of the RAN node 170, and computer program code 173 of the networks element(s) 190.

The apparatus 2000 may be UE 110, RAN node 170 (e.g. gNB), or network element(s) 190 Thus, processor 2002 may correspond respectively to processor(s) 120, processor(s) 152, or processor(s) 175, memory 2004 may correspond respectively to memory(ies) 125, memory(ies) 155, or memory(ies) 171, computer program code 2005 may correspond respectively to computer program code 123, module 140-1, module 140-2, computer program code 153, module 150-1, module 150-2, or computer program code 173, and N/W I/F(s) 2010 may correspond respectively to N/W I/F(s) 161 or N/W I/F(s) 180. Alternatively, apparatus 2000 may not correspond to either of UE 110, RAN node 170, or network element(s) 190.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, fixed memory and removable memory. The memory(ies) may comprise a database for storing data.

As used herein, the term 'circuitry' or 'circuit' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An example method includes generating an initial assignment, for a plurality of counties, of a logical channel obtained by a priority access license user to a physical channel, considering a plurality of preferred channel assignments of the users within each county; generating a county prioritization list that prioritizes counties having challenges resulting from the initial assignment; executing a series of algorithms, for each county within the county prioritization list, to continue to assign the physical channels to comply with a set of requirements of the priority access license users; and updating, for each priority access license user, a similarity metric that measures a similarity between a desired physical channel assignment and an actual physical channel assignment, wherein the metric is used during the continuation of the assignment of the physical channels.

The method may further include wherein the initial assignment generates: a list of counties where the assignment satisfies a preferred configuration; and a list of counties where tradeoffs in some requirements from the priority access license users are necessary; wherein the lists are used to generate the county prioritization list.

The method may further include wherein the metric is used to provide for inter-county fairness of the assignments by balancing the set of requirements of the priority access license users across the plurality of counties.

The method may further include reevaluating the assignment of the physical channels in response to the metric being above or below a threshold.

The method may further include wherein the plurality of preferred channel assignments within each county correspond to preferences of the priority access license users within a specific county.

The method may further include adjusting any of the series of algorithms in response to a change in one or more allocation constraints.

The method may further include wherein among the series of algorithms, a first algorithm is used to verify whether there is an allocation of the physical channels that results in the set of requirements of each user to be met.

The method may further include wherein the first algorithm comprises: searching through the preferred channel assignments of the priority access license users within each county to determine whether an assignment complying with the preferred channel assignments is possible; selecting an assignment based on the similarity metric to lessen an undesirability of the assignment, wherein the undesirability is determined by the priority access license users; and presenting the assignment to the priority access license users.

The method may further include wherein among the series of algorithms, a second algorithm is used during the continuation of the assigning of the physical channels, and comprises: removing physical undesired channels of a priority access license user from the entirety of available physical channels; and assigning, if available, a contiguous portion of a spectrum to the priority access license user.

The method may further include wherein the second algorithm further comprises at least one of: truncating the PUCs; or selectively reducing the physical undesired channels of the priority access license users considering inter-county contiguity and the similarity metric.

The method may further include wherein among the series of algorithms, a third algorithm is used during the continuation of the assigning of the physical channels in response to either: a failure to locate an assignment respecting an undesired channels list of the priority access license users and a contiguous channel requirement; or a failure to execute an algorithm to verify whether there is an allocation of the physical channels that results in the set of requirements of each user to be met.

The method may further include wherein the third algorithm comprises: removing, from a set of assignable channels, channels known by a spectrum access system to be of lower quality; listing the priority access license users arranged from a user requesting a largest set of contiguous channels to the least; and allocating, based on the list, a set of contiguous channels.

The method may further include wherein the third algorithm, in response to a failure to generate a successful assignment, further comprises reducing the set of non-assignable channels, and re-executing the third algorithm.

The method may further include wherein among the series of algorithms, a fourth algorithm is used during the continuation of the assigning of the physical channels to avoid assigning bad channels to the same types of users.

The method may further include wherein the fourth algorithm comprises: ordering the priority access license users randomly; assigning, based on the random ordering, the priority access license users a first assignable channel and subsequent channels until a demanded consecutive channel is fulfilled; removing the assigned channels from the list of assignable channels; and repeating the assigning based on the random ordering.

The method may be performed by a spectrum access system.

The method may further include wherein a spectrum access system is configured to consider the one or more allocation constraints, and the one or more allocation constraints comprise one or more of: assigning channels for each priority access license user; allocating, to the extent possible, contiguous channels to priority access license users holding more than one channel license; avoiding, to the extent possible, assignment of known low quality channels; accommodating, to the extent possible, priority access license user preferred channels; or allowing, to the extent possible, for channels to be assigned across counties.

The method may further include wherein the physical channel is used for transmission by a device of the user.

An example apparatus includes at least one processor; and at least one non-transitory memory including computer program code; wherein the at least one memory and the computer program code are configured to, with the at least one processor, cause the apparatus at least to perform: generate an initial assignment, for a plurality of counties, of a logical channel obtained by a priority access license user to a physical channel, considering a plurality of preferred channel assignments of the users within each county; generate a county prioritization list that prioritizes counties having challenges resulting from the initial assignment; execute a series of algorithms, for each county within the county prioritization list, to continue to assign the physical channels to comply with a set of requirements of the priority access license users; and update, for each priority access license user, a similarity metric that measures a similarity between a desired physical channel assignment and an actual physical channel assignment, wherein the metric is used during the continuation of the assignment of the physical channels.

An example non-transitory program storage device readable by a machine, tangibly embodying a program of instructions executable by the machine for performing operations may be provided, the operations comprising: generating an initial assignment, for a plurality of counties, of a logical channel obtained by a priority access license user to a physical channel, considering a plurality of preferred channel assignments of the users within each county; generating a county prioritization list that prioritizes counties having challenges resulting from the initial assignment; executing a series of algorithms, for each county within the county prioritization list, to continue to assign the physical channels to comply with a set of requirements of the priority access license users; and updating, for each priority access license user, a similarity metric that measures a similarity between a desired physical channel assignment and an actual physical channel assignment, wherein the metric is used during the continuation of the assignment of the physical channels.

An example apparatus may include means for generating an initial assignment, for a plurality of counties, of a logical channel obtained by a priority access license user to a physical channel, considering a plurality of preferred channel assignments of the users within each county; means for generating a county prioritization list that prioritizes counties having challenges resulting from the initial assignment; means for executing a series of algorithms, for each county within the county prioritization list, to continue to assign the physical channels to comply with a set of requirements of the priority access license users; and means for updating, for each priority access license user, a similarity metric that measures a similarity between a desired physical channel assignment and an actual physical channel assignment, wherein the metric is used during the continuation of the assignment of the physical channels.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The invention claimed is:

1. A method comprising:
   generating an initial assignment, for a plurality of geographical areas, of at least one logical channel obtained with at least one priority access license user to at least one physical channel, considering a plurality of preferred channel assignments of priority access license users within the plurality of geographical areas;
   generating an ordered geographical area prioritization list that prioritizes a subset of the geographical areas based on the initial assignment, in order of priority;
   selecting a geographical area from the subset having a priority higher than a priority of another geographical area within the ordered geographical area prioritization list, to assign the at least one logical channel obtained with the at least one priority access license user within the selected geographical area to the at least one physical channel;
   continuing to assign the at least one physical channel based on at least one preference of the priority access license users, for at least one geographical area within the geographical area prioritization list; and
   updating, for the at least one priority access license user, a similarity metric that measures a similarity between a desired physical channel assignment and an actual physical channel assignment, wherein the metric is used during the continuation of the assignment of the at least one physical channel.

2. The method of claim 1, wherein the initial assignment generates:
   a first list of at least one geographical area where the assignment satisfies a preferred configuration; and
   a second list of at least one geographical area where at least one tradeoff in at least one criterion of the priority access license users exists;
   wherein the first list and the second list are used to generate the ordered geographical area prioritization list.

3. The method of claim 1, wherein the metric is used to provide for fairness of the assignments across geographical areas with balancing a set of at least one criterion of the priority access license users across the geographical areas.

4. The method of claim 1, further comprising reevaluating the assignment of the at least one physical channel in response to the metric being above or below a threshold.

5. The method of claim 1, wherein the plurality of preferred channel assignments within the plurality of geographical areas correspond to preferences of the priority access license users within a respective geographical area.

6. The method of claim 1, further comprising adjusting at least one assignment in response to a change in at least one allocation constraint.

7. The method of claim 1, wherein a verification method is used to verify whether there is an allocation of the physical channels that results in the set of requirements of each user to be met.

8. The method of claim 7, wherein the verification method comprises:
   searching through the preferred channel assignments of the priority access license users within the plurality of geographical areas to determine whether an assignment complying with the preferred channel assignments is possible;
   selecting an assignment based on the similarity metric to lessen an undesirability of the assignment, wherein the undesirability is determined with the priority access license users; and
   presenting the assignment to the priority access license users for acceptance.

9. The method of claim 1, further comprising:
generating an ordered priority access license user list, in order of a number of contiguous channels requested with the at least one priority access license user;
selecting a priority access license user from the ordered priority access license user list that has requested more contiguous channels than another priority access license user within the ordered priority access license user list;
removing at least one physical undesired channel of the selected priority access license user from a list of assignable physical channels; and
assigning, when available, a contiguous portion of a spectrum to the selected priority access license user.

10. The method of claim 9, further comprising:
decreasing a number of the physical undesired channels; or
selectively reducing the physical undesired channels of the priority access license users considering contiguity across geographical areas and the similarity metric.

11. The method of claim 9, further comprising ordering randomly or based on the similarity metric, a plurality of priority access license users within the ordered priority access license user list, in response to the plurality of priority access license users within the ordered priority access license user list requesting a common number of contiguous channels.

12. The method of claim 1, further comprising:
communicating, to the at least one priority access license user, a number of the preferred channel assignments for indication;
receiving, from the at least one priority access license user, the indication of the preferred channel assignments, the preferred channel assignments comprising the at least one logical channel obtained with the at least one priority access license user;
wherein the number of the preferred channel assignments are received from the at least one priority access license user; and
wherein the at least one algorithm that is executed to continue to assign the at least one logical channel to the at least one physical channel uses the preferred channel assignments received from the at least one priority access license user.

13. The method of claim 1, further comprising an algorithm that comprises, in response to either a failure to locate an assignment based on an undesired channels list of the priority access license users and a contiguous channel criterion, or a failure to verify whether there is an allocation of the at least one physical channel that results in at least one criterion of the at least one priority access license user to be met:
removing, from a set of assignable channels, channels known to be of lower quality;
generating an ordered priority access license user list, in order of a number of contiguous channels requested with the at least one priority access license user;
selecting a priority access license user from the ordered priority access license user list that has requested more contiguous channels than another priority access license user within the ordered priority access license user list; and
allocating, based on the list, a set of at least one contiguous channel to the selected priority access license user channels.

14. The method of claim 13, further comprising, in response to a failure to generate a successful assignment, reducing a set of non-assignable channels, and re-executing the algorithm.

15. The method of claim 13, further comprising ordering randomly a plurality of priority access license users within the ordered priority access license user list, in response to the plurality of priority access license users within the ordered priority access license user list requesting a common number of contiguous channels.

16. The method of claim 1, wherein an algorithm is used during the continuation of the assigning of the physical channels to avoid assigning channels determined to be of poor quality to the same types of users.

17. The method of claim 16, wherein the fourth algorithm comprises:
ordering the priority access license users randomly;
assigning, based on the random ordering, the priority access license users a first assignable channel and subsequent channels until a user-demanded consecutive channel is fulfilled;
removing the assigned channels from a list of assignable channels; and
repeating the assigning based on the random ordering.

18. The method of claim 17, wherein ordering the priority access license users randomly comprises ordering the priority access license users randomly in favor of users having a lower similarity metric between the desired physical channel assignment and the actual physical channel assignment, wherein users having a lower similarity metric are given the assignment of the at least one physical channel before users having a higher similarly metric.

19. The method of claim 1, performed with a spectrum access system.

20. The method of claim 1, wherein a spectrum access system is configured to consider a plurality of allocation constraints, the plurality of allocation constraints comprising:
assigning channels for the at least one priority access license user;
allocating, to the extent possible, contiguous channels to priority access license users holding more than one channel license;
avoiding, to the extent possible, assignment of known low quality channels;
accommodating, to the extent possible, priority access license user preferred channels; and
allowing, to the extent possible, for channels to be assigned across geographical areas.

21. The method of claim 1, wherein the at least one physical channel is used for transmission with a device of the user.

22. The method of claim 1, wherein generating the ordered geographical area prioritization list that prioritizes a subset of the geographical areas based on the initial assignment, in order of priority is based on at least one of:
a number of priority access license users in the geographical area;
a sum of physical undesired channels of the priority access license users in the geographical area;
a number of impaired channels in the geographical area; or
a number of at least one neighboring geographical area for which at least one criterion of at least one priority access license user within the neighboring geographical area has not been met.

23. An apparatus comprising:
at least one processor; and
at least one non-transitory memory including computer program code;
wherein the at least one memory and the computer program code are configured to, with the at least one processor, cause the apparatus at least to:
generate an initial assignment, for a plurality of geographical areas, of at least one logical channel obtained with at least one priority access license user to at least one physical channel, considering a plurality of preferred channel assignments of priority access license users within the plurality of geographical;
generate an ordered geographical area prioritization list that prioritizes a subset of the geographical areas based on the initial assignment, in order of priority;
select a geographical area from the subset having a priority higher than a priority of another geographical area within the ordered geographical area prioritization list, to assign the at least one logical channel obtained with the at least one priority access license user within the selected geographical area to the at least one physical channel;
continue to assign the at least one physical channel based on at least one preference of the priority access license users, for at least one geographical area within the geographical area prioritization list; and
update, for the at least one priority access license user, a similarity metric that measures a similarity between a desired physical channel assignment and an actual physical channel assignment, wherein the metric is used during the continuation of the assignment of the at least one physical channel.

24. A non-transitory program storage device readable with a machine, tangibly embodying a program of instructions executable with the machine for performing operations, the operations comprising:
generating an initial assignment, for a plurality of geographical areas, of at least one logical channel obtained with at least one priority access license user to at least one physical channel, considering a plurality of preferred channel assignments of priority access license users within the plurality of geographical areas;
generating an ordered geographical area prioritization list that prioritizes a subset of the geographical areas based on the initial assignment, in order of priority;
selecting a geographical area from the subset having a priority higher than a priority of another geographical area within the ordered geographical area prioritization list, to assign the at least one logical channel obtained with the at least one priority access license user within the selected geographical area to the at least one physical channel;
continuing to assign the at least one physical channel based on at least one preference of the priority access license users, for at least one geographical area within the geographical area prioritization list; and
updating, for the at least one priority access license user, a similarity metric that measures a similarity between a desired physical channel assignment and an actual physical channel assignment, wherein the metric is used during the continuation of the assignment of the at least one physical channel.

* * * * *